M. W. BARTMESS.
CENTRIFUGAL CLUTCH.
APPLICATION FILED MAR. 3, 1914.
1,204,392.
Patented Nov. 14, 1916.
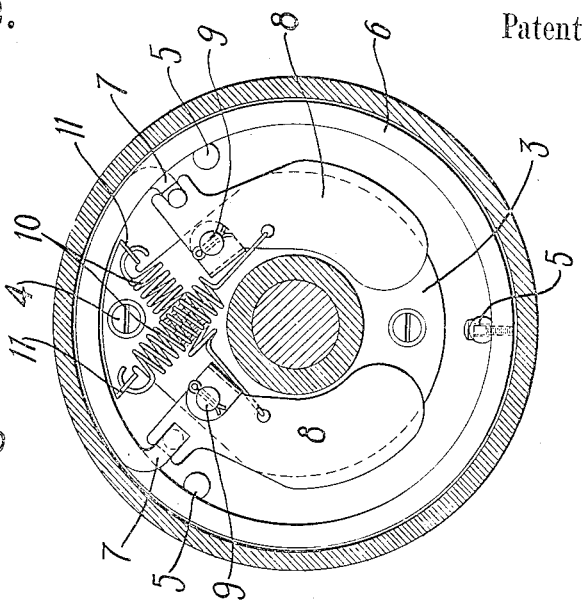
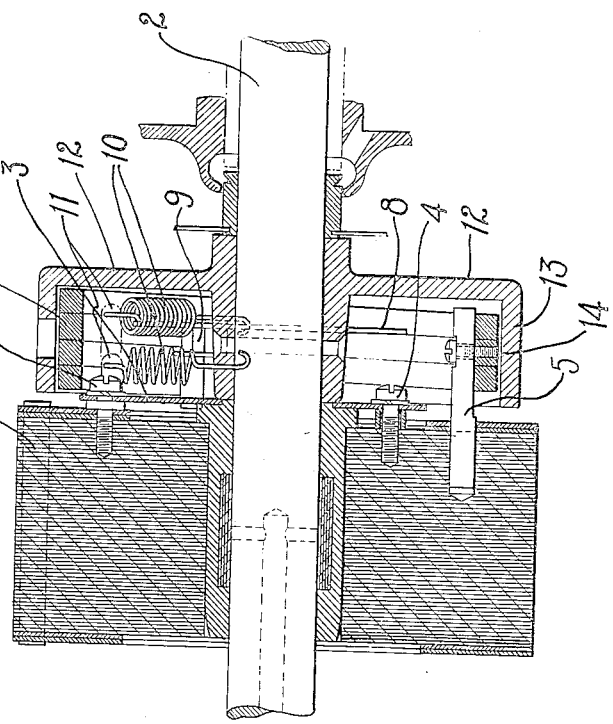
WITNESSES:
M. A. Schubeler
J. P. Langley.
INVENTOR
Meigs W. Bartmess
BY
Wiley E. Carr
ATTORNEY

UNITED STATES PATENT OFFICE.

MEIGS W. BARTMESS, OF PITTSBURGH, PENNSYLVANIA, ASSIGNOR TO WESTINGHOUSE ELECTRIC AND MANUFACTURING COMPANY, A CORPORATION OF PENNSYLVANIA.

CENTRIFUGAL CLUTCH.

1,204,392. Specification of Letters Patent. Patented Nov. 14, 1916.

Application filed March 3, 1914. Serial No. 822,174.

*To all whom it may concern:*

Be it known that I, MEIGS W. BARTMESS, a citizen of the United States, and a resident of Pittsburgh, in the county of Allegheny and State of Pennsylvania, have invented a new and useful Improvement in Centrifugal Clutches, of which the following is a specification.

My invention relates to centrifugal clutches and particularly to such clutches as are adapted for use in connection with motors having small starting torque.

My invention has for its object to provide a clutch that is simple and durable in construction and is capable of transmitting energy to a rotatable member with equal efficiency in either direction.

It is well known that certain types of motors, such, for example, as single-phase induction motors, have inherently small starting torque and that, by reason of this fact, they are unable to start under load. It has been proposed, to provide clutches for motors of the above mentioned character with helical springs for connecting the driving members to the driven members at a predetermined speed. It has been found, however, that a clutch, constructed in this manner, possesses a number of inherent defects. The light weight of the spring requires an adjustment that is too delicate for the service for which it is intended. It is difficult, also, to produce duplicate springs of uniform strength. There is a tendency for this type of clutch to chatter when a certain critical load is reached.

According to my present invention, I provide a clutch comprising concentric rotatable driving and driven members. A helical spring, which is carried by the driving member, is expanded at a predetermined speed by weighted levers that are thrown outwardly by centrifugal force. It has been found that a clutch, constructed in accordance with my invention, operates positively and uniformly, and that the defects above noted are obviated.

In the accompanying drawings, Figure 1 is a view, in longitudinal section, of the rotatable member of a dynamo-electric machine with my invention applied thereto. Fig. 2 is an end view, partially in elevation and partially in section, of the clutch mechanism.

The rotor 1 of an electric motor is rotatably mounted upon a shaft 2 which may be connected, in any suitable manner, to the load to be driven. A disk 3 is attached to the rotor 1 by means of suitable bolts or screws 4. The rotor 1 is provided, upon its front face, with three circumferentially disposed studs 5 that are located at substantially equi-distant points. A helical spring 6, which surrounds the studs 5 and is supported by them, is fixed, at an intermediate point, to one of the studs. The spring 6 is provided, at each end, with an inwardly extending portion 7 to be engaged by a weighted lever 8 having a pivotal support indicated at 9. The weights 8 are normally held inwardly by springs 10 which are attached at one end to ears 11 on the disk 3 and, at the other end, to the weights 8.

The driven member of the clutch comprises a pulley or other suitable member 12 which is secured to the rotatable shaft 2 and is provided with a circumferential flange 13. The flange 13 is provided, upon its inner periphery, with a frictional engaging surface 14 that is adapted to be engaged by the helical spring 6 when the latter is expanded by the outward movement of the weighted levers 8.

It may be assumed that the shaft 2 is connected to any suitable load and that it is desired to start the motor. Normally, the several parts will occupy their respective positions as illustrated, with the spring 6 adjacent to the flange 13 but disengaged therefrom. The rotor 1 will rotate freely upon the shaft 2 until a predetermined speed is reached, whereupon the weighted levers 8 will move outwardly, about their respective pivots, against the tension of the opposing springs 10 and the tension of the spring 6. Outward movement of the levers 8 actuates the end portions 7 of the spring 6 toward each other and the result is to so expand the spring 6 that it engages the surface 14 of the flange 13, and the pulley 12 and the shaft 2 will thereby be caused to rotate with the rotor 1, in a well known manner.

It will be noted that, as the weighted levers 8 move outwardly, the lever arms of the springs 10 decrease. This arrangement insures that the springs 10 will exert substantially a uniform moment throughout the movement of the levers 8. By means of the above construction, I am able to produce a quick positive action, since the force of the weights is large in comparison to that of the helical spring 6. The device may be arranged to operate at any desired speed by regulating the tension of the springs 10 or the weights of the levers 8. The attachment of the spring 6 at its middle point provides a rigid driving support which allows equally efficient operation in either direction of rotation.

While I have shown and described my invention as applied to dynamo-electric machines, it is obvious that it may be employed for various purposes.

It is understood that such modifications may be made, without departing from the spirit of my invention, as fall within the scope of the appended claims.

I claim as my invention:

1. In a centrifugal clutch, the combination with a rotatable driving member, and a rotatable driven member, of a coil spring on said driving member, and means pivotally connected to said driving member for causing said spring to engage said driven member at a predetermined speed.

2. The combination with rotatable driving and driven members, of a helical spring connected to said driving member, and a lever mechanism actuated by centrifugal force for expanding said spring to engage said driven member.

3. The combination with concentric rotatable driving and driven members, of a helical spring attached to said driving member and adjacent said driven member, and means pivotally connected to said driving member for expanding said spring at a predetermined speed.

4. The combination with a rotatable driving member and a rotatable driven member having an engaging surface, of a helical spring on said driving member having a coacting engaging surface, and levers actuated by centrifugal force for effecting the engagement of said surfaces.

5. The combination with a rotatable driving member and a rotatable driven member, of an expansible spring adjacent said driven member and attached, at a point intermediate its ends, to said driving member, and means actuated by centrifugal force for causing relative movement of the ends of said spring.

6. The combination with a rotatable driving member and a rotatable driven member, of a resilient member interposed between said members and attached, at a point intermediate its ends, to said driving member, and means actuated by centrifugal force for causing relative movement of the ends of said resilient member.

In testimony whereof, I have hereunto subscribed my name this 24th day of Feb. 1914.

MEIGS W. BARTMESS.

Witnesses:
B. B. HINES,
M. C. MERZ.